United States Patent [19]

Sandstrom

[11] Patent Number: 4,491,655

[45] Date of Patent: Jan. 1, 1985

[54] RUBBER CONTAINING ESTERS OF ROSIN ACID

[75] Inventor: Paul H. Sandstrom, Tallmadge, Ohio

[73] Assignee: The Goodyear Tire & Rubber Company, Akron, Ohio

[21] Appl. No.: 568,964

[22] Filed: Jan. 6, 1984

[51] Int. Cl.³ .............................................. C08L 93/00
[52] U.S. Cl. .................................... 527/600; 524/270; 524/271; 524/272; 524/273; 524/274; 524/764; 524/798; 526/238.3
[58] Field of Search ................. 527/600; 524/270–274, 524/764, 798; 526/238.3

[56] References Cited

U.S. PATENT DOCUMENTS

| | | | |
|---|---|---|---|
| 1,852,244 | 4/1932 | Humphrey | 260/106 |
| 3,427,269 | 2/1969 | Davis et al. | 524/271 |
| 3,687,889 | 8/1972 | Witte et al. | 260/30.6 R |
| 3,951,901 | 4/1976 | Bluemel et al. | 260/33.6 AQ |
| 3,985,701 | 10/1976 | Schneider et al. | 260/33.6 AQ |
| 4,072,735 | 2/1978 | Ardemagni | 524/274 |
| 4,324,710 | 4/1982 | Davis et al. | 524/274 |
| 4,373,041 | 2/1983 | Wood et al. | 524/270 |

FOREIGN PATENT DOCUMENTS 962519  7/1964  United Kingdom .

OTHER PUBLICATIONS

Howland et al., Ind. & Eng. Chem., vol. 45, No. 5, May, 1953, pp. 1053–1059.

*Primary Examiner*—Herbert S. Cockeram
*Attorney, Agent, or Firm*—D. O. Nickey

[57] ABSTRACT

There is disclosed the use of esters especially methyl esters of rosin acids as total or partial replacements for oil in rubber formulations. Vulcanizate properties, low temperature performance, and processibility are comparable when using either the rosin ester or an aromatic oil, however, the rosin ester extended rubber demonstrates improved abrasion resistance and flex resistance.

9 Claims, No Drawings

RUBBER CONTAINING ESTERS OF ROSIN ACID

TECHNICAL FIELD

This invention relates to a process for the production of rubber-oil mixtures wherein customary petroleum derived extending oils are replaced with esters of rosin acid, more specifically, the methyl ester of rosin acids.

BACKGROUND ART

Both natural and synthetic elastomers usually require the use of processing aids to assist mechanical breakdown. Materials such as mixtures of oil soluble sulfonic acids of high molecular weight with a high boiling alcohol and a paraffin oil or a blend of a sulfonated petroleum product and selected mineral oils are presently used as processing aids. Some chemicals used primarily for other purposes have a plasticizing action on rubbers in which they are compounded, i.e. benzylthiazole disulfide, also known as Altax TM.

Petroleum, paraffinic and vegetable oils, as well as coal tar and petroleum residues or pitches and naturally occurring or synthetic resins have also been used as compounding materials.

Beneficial effects of processing aids carry on through the mixing cycle permitting incorporation of fillers and other ingredients with low power consumption. These materials also reduce internal friction in calendering and extrusion, thus minimizing scorch.

Various types of rosin acids have been used as extenders for high molecular weight SBR. *Properties of GR-S Extended With Rosin Type Acids*, L. H. Howland, J. A. Reynolds, and R. L. Provost, Industrial and Engineering Chemistry, Vol. 45, No. 5, May 1953. Also included in these initial studies were several nonrosin acids which included tallow fatty acid, oleic acid and naphthenic acid. Reasonably good cured physical properties can be obtained with the rosin type acids, whereas relatively poor physical properties are obtained with the nonrosin acids. Problems associated with the use of rosin acids are cure retardation, high tack and poor low temperature performance, which limit their use as an extender in rubber formulations.

British Patent No. 962,519 describes elastomeric hydrocarbon copolymers of at least one α-monoolefin and at least one nonconjugated diene which are extended with specific petroleum oils to give normally solid, sulfur curable mixtures.

U.S. Pat. No. 3,951,901 describes a process for preparing a rubber wherein an extending oil with a specific viscosity and a certain specific gravity is added to the copolymer at a particular temperature with a specific agitation so as to form a homogeneous liquid mixture substantially free of particulate copolymer.

U.S. Pat. No. 3,985,701 discloses an oil containing rubber prepared by mixing a rubber selected from the group consisting of natural rubber, homopolymers of conjugated diolefins and copolymers of conjugated diolefins with ethylenically unsaturated monomers, with mineral oil having at least 10 weight percent aromatic compound which is obtained through a specific chemical process.

U.S. Pat. No. 3,687,889 discloses an oil-extended polyisoprene composition which consists of a synthetic polyisoprene and from 15 to 50 parts by weight of a rubber extending oil and a process for producing said mixture.

None of the prior art suggests or discloses the use of the esters, specifically methyl esters, of wood rosins as a total or partial replacement for conventionally accepted extending oils. Further, the prior art does not suggest or disclose the advantageous properties that can be obtained through use of esters of rosin as a replacement for petroleum based extending oils. The unexpected properties obtainable through use of the present invention include increased abrasion resistance (particularly after aging) and lack of extractability from aged cured compounds.

Rosin is a solid resinous material that occurs naturally in pine trees. There are three major sources of rosin, (1) from the oleoresin exudate of the living pin tree, (2) from the oleoresin contained in the aged stump of the longleaf pine; and (3) from the tall oil produced as a by-product in the paper industry.

The aged virgin pine stump is the source of wood rosin. The stump is allowed to remain in the ground for about ten years so that its bark and sapwood may decay and slough off to leave the heartwood rich in resin.

Rosin is a complex mixture of many resin acids and a small amount of nonacidic components. Chemical treatment of rosins, such as hydrogenation, dehydrogenation, or polymerization are known which produce modified resins.

Rosin acids are monocarboxylic acids having the typical molecular formula, $C_{20}H_{30}O_2$. Over the years nomenclature of individual acids has changed. In addition to trivial names, such as abietic, levopimaric, etc. three different numbering systems have been used. IUPAC nomenclature names resin acids as derivatives of abietane. The following is a structural formula for abietic acid:

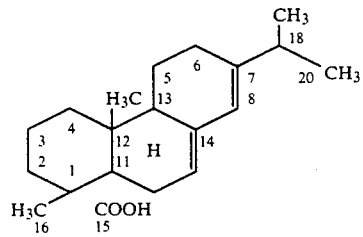

Wherein the spacial relationship of substituents on asymmetric carbon atoms are designated as α or β to denote whether the substituents are above or below the plane of the paper. For example, α-methyl denotes the methyl group as below the plane and is represented by a dotted line, while β-methyl would be above the plane and is represented by a solid line.

The resin acid molecule possesses two chemically reactive centers, the double bonds and the carboxyl group. Through these, many modifications in structure and numerous derivatives are obtainable. Because rosin is composed of a number of resin acids, the chemistry of its reactions is relatively complex. For example, resin acids react at the double bond in isomerization reactions and reactions with maleic anhydride. Reactions of certain resin acids with hypochlorite have been reported. Hydrogenation and dehydrogenation have also been reported as a means for modifying rosins to render them less susceptible to oxidation by atmospheric oxygen.

In addition to the double bond reactions, rosin acids also undergo typical carboxyl group reactions. Salt and esters of rosin are important commercial derivatives of rosin. Other reactions involve the reduction of the carboxyl group to the alcohol and the conversion of the carboxyl group to the nitrile.

The structurally hindered nature of the resin acid carboxyl group makes it necessary to use high temperatures or generally drastic conditions to bring about esterification. This hindrance is in turn responsible for the unusual resistance of the ester linkage to cleavage by water, acid or alkali. Ester gum is used extensively in cellulose ester lacquers for interior application because of its low cost, solubility in lacquer solvents and the desirable properties it imparts to the lacquer.

The present invention is concerned with the use of esters of rosin acid as a replacement for petroleum based extender oils in rubber compounds, more specifically, tire compounds. The use of methyl esters of rosin acid has unexpectedly improved low temperature performance and provided less tack when compared with rosin acid and also has a significant effect on the abrasion resistance of the compounded rubber. It was also discovered that aged rubber compounds which contained the methyl ester of rosin as the extender had less extractables than similar compounds containing petroleum based extending oils.

DISCLOSURE OF THE INVENTION

There is disclosed a process for preparing rubber compositions which comprises admixing a rubber selected from the group consisting of natural rubber, homopolymers of conjugated diolefins and copolymers of conjugated diolefins and ethylenically unsaturated monomers with esters of rosin acids.

There is further disclosed a process for preparing rubber compositions wherein an ester of rosin acid, at a concentration from 10 parts per hundred to 70 parts per hundred based on weight of rubber, is in an intimate admixture with said rubber.

The term "rubber" as used herein embraces both natural rubber and all its various raw and reclaimed forms as well as various synthetic rubbers, i.e., rubber polymers of the type which may be vulcanized with sulfur or other vulcanizing agents. Representative synthetic rubbery polymers of this variety are the homopolymerization products of butadiene and its homologs and derivatives, as for example, methylbutadiene, dimethyl butadiene, pentadiene and chloroprene (neoprene synthetic rubber), as well as copolymers such as those formed from butadiene, or its homologs or derivatives, with other unsaturated organic compounds. Among the latter are acetylenes, e.g. vinyl acetylene; olefins, e.g. isobutylene which copolymerizes with isoprene to form butyl rubber; vinyl compounds, e.g., vinyl chloride, acrylic acid, acrylonitrile (which polymerizes with butadiene to form Buna N rubber), methacrylic acid and styrene, the latter compound polymerizing with butadiene to form Buna-S rubber, as well as vinyl esters and various unsaturated aldehydes, ketones and ethers, e.g. acrolein, methyl isopropenyl ketone and vinyl ethyl ether. Also included, are the various synthetic rubbers prepared from the homopolymerization of isoprene and the copolymerization of isoprene with other diolefins and various unsaturated organic compounds. Additionally included are the synthetic rubbers prepared from modifications of 1,4-cis-polybutadiene and 1,4-cis-polyisoprene and similar synthetic rubbers which have been developed in recent years. Such recently developed rubbers include those that have polymer bound functionality, such as antioxidants and antiozonants. These polymer bound materials are known in the art and can have functionalities that provide antidegradative properties, synergism, cure acceleration and other properties. The polymer bound functions have great value since the pendant functionality possessing the desired activity cannot be extracted since it is chemically attached to the backbone of the polymer.

The preferred rubbers useful within the scope of the present invention are styrene/butadiene copolymers, polybutadiene and polyisoprene rubbers.

The esters of rosin acids useful in the present invention may be obtained from polyhydric as well as monohydric alcohols. The resulting esters have a wide range of physical properties.

The introduction of catalysts in the production of esters of polyhydric alcohols has led to many improvements both with respect to reduced reaction time and improved quality. Zinc and its salts exert a catalytic effect when used in the reaction mixture, the esterification time being reduced to one-fourth of normal. For the production of ester gum of superior properties the use of stainless steel, Monel, or aluminum kettles is desirable. Iron is to be avoided as dark-colored products result.

Glycol and diethylene glycol are also used to prepare esters by heating rosin at 250°–260° C. in the presence of zinc dust or boric acid catalyst. The unreacted alcohol is removed by heating the ester at 300° C. under reduced pressure. Bent and Johnston, U.S. Pat. No. 1,820,256, esterified rosin with pentaerythritol, erythritol, and anhydroenneaheptitol by heating at 250°–280° C. with a catalyst such as zinc dust or boric acid in an inert atmosphere. Tikhomirov, Lakokrasochnuyu Ind. Za 1935(3) 27; Chem Abstr. 31,6666 (1937) prepared the pentaerythritol ester of rosin by heating the two ingredients at 260°–280° C. for 7 hours to obtain a product with low acid number and softening point at 95° C.

The rosin esters of monohydric alcohols are of low softening point and are used as plasticizers in nitrocellulose lacquers. As in the other instances, many methods of preparation have been devised. Kaiser, U.S. Pat. No. 2,074,963, described a continuous method for the esterification of rosin which consisted of passing rosin and the alcohol concurrently through a chamber maintained at 225°–390° C. under pressure. Johnston, U.S. Pat. No. 1,840,395, reports esterification without the use of catalysts if higher temperatures (260°–360° C.) and high pressures (400–1700 psi) are used with anhydrous alcohols, provided the water produced during the reaction is removed. A neutral ester can be obtained by distillation over soda ash.

Some of the liquid esters of rosin in commercial production and some of their properties are listed in Table I.

TABLE I

| \multicolumn{5}{c}{Liquid Esters of Rosin and Their Physical Properties} |
| Chemical Name | Softening point | Acid no. | Sp gr at 25° C. | Refractive index at 25° C. white light |
| --- | --- | --- | --- | --- |
| methyl ester of rosin | viscous liquid | 8 | 1.02 | 1.529 |
| hydrogenated methyl ester of rosin | viscous liquid | 8 | 2.02 | 1.518 |
| triethylene glycol ester of hydrogenated | viscous liquid | 10 | 1.085 | 1.5180 |

TABLE I-continued

| Chemical Name | Softening point | Acid no. | Sp gr at 25° C. | Refractive index at 25° C. white light |
|---|---|---|---|---|
| rosin | | | | |

The present invention also contemplates the combined use of esters of rosin acid especially the methyl esters, and customary extender oils in rubber. The extender oils which may be incorporated with the rosin esters in rubbers are any of those extender oils which are conventionally used in the rubbery industry. Extender oils of particular utility are largely composed of naphthenic and alkylated naphthenic hydrocarbons and mixtures thereof with various aromatic hydrocarbons. Such oils may be obtained from the high boiling fractions of the so-called naphthenic or mixed based crude oils such as Mid Continent, Louisiana, East Texas, and similar crude oils. They may comprise distillate fractions boiling above about 200° C. Suitable fractions are those at least 90 percent of which boil above about 250° C. as more volatile members may be lost during or after compounding and curing the rubber. The oil is preferably free of waxes and asphaltenes for most purposes.

Representative of the liquid esters that are useful in the present invention are; methyl ester of rosin, hydrogenated methyl ester of rosin, and the triethylene glycol ester of rosin, and its hydrogenated form.

The ester of rosin acids as extenders for rubber provide outstanding properties in vulcanization behavior characterized by favorable scorch behavior and crosslinking yield, and also an excellent vulcanizate with desirable tensile strength, modulus, hardness (Shore A), resilience and tear resistance.

BEST MODE FOR CARRYING OUT THE INVENTION

A rubber composition containing the materials set out in Table II was prepared in a BR Banbury using two separate passes for three minutes at 70 RPM.

TABLE II

| Material | Wt Parts |
|---|---|
| SBR* | 70 |
| Polybutadiene** | 30 |
| GPT Carbon Black | 70 |
| Extender | 35 |

*Acid/Alum coagulated latex of SBR 1712 containing 1.25 phr Wingstay 29 ™ p-oriented styrenated diphenylamines as a stabilizer.
**Budene 1207 ™ The Goodyear Tire & Rubber Company The sulfur and accelerator were added to the compound in a third Banbury mix for 3 minutes at 40 RPM. The SBR latex was obtained from a commercial facility and coagulated to a dry crumb without the normal addition of aromatic processing oil. The oil, rosin, or rosin ester additions were made directly to the Banbury during the nonproductive mixing stage. Banbury energy input and temperature at dump for these batches are shown in Table III.

Samples of Pinex ™ resin (rosin acid), Abalyn ™ resin (methyl ester of rosin) and Hercolyn D ™ resin (hydrogenated methyl ester of rosin) were obtained from Hercules, Inc. of Wilmington, Del. and used as the extending oils in the experimental recipes.

Table IV sets out the cure behavior and vulcanizate properties of the controls and experimentals.

TABLE III

| Banbury Batches | Banbury Energy Input | | | | | | Total |
|---|---|---|---|---|---|---|---|
| | Non-Productive* | | Non-Productive** | | Productive*** | | Work MJ/m³ |
| | Work MJ/m³ | Temp °C. | Work MJ/m³ | Temp °C. | Work MJ/m³ | Temp °C. | |
| Control I (Naphthenic) | 780 | 127 | 745 | 132 | 453 | 71 | 1978 |
| Control II (Aromatic) | 798 | 135 | 778 | 143 | 458 | 82 | 2034 |
| (Pinex ™) - Rosin Acid Experimental I | 735 | 129 | 803 | 146 | 468 | 82 | 2006 |
| (Abalyn ™) methyl ester of rosin Experimental II | 703 | 132 | 808 | 149 | 448 | 82 | 1959 |
| (Herculyn D ™) - hydrogenated methyl ester of rosin Experimental III | 750 | 138 | 685 | 151 | 410 | 80 | 1845 |

*3 min @ 70 RPM - prior to addition of sulfur and accelerator
**3 min @ 70 RPM - prior to addition of sulfur and accelerator
***3 min @ 40 RPM - addition of sulfur and accelerator From Table IV it is evident that the compound containing rosin acid (Pinex ™), Experimental I, as the extender exhibited a slower rate of cure and a reduced maximum rheometer torque when compared with the control samples containing naphthenic or aromatic processing oil. The samples with the methyl esters, Experimentals II and III, exhibited cure behavior similar to the controls. The stress-strain properties of the vulcanizates extended with the rosin esters are comparable to the control containing aromatic oil. The rosin acid extended vulcanizate, Experimental I, exhibited a much lower 300 percent modulus and tensile strength.

The low temperature performance of these vulcanizates was determined by the use of the ASTM D1053 flex test and is also set out in Table IV. This test involves an initial measurement of the Young's modulus at 25° C. and then repeated measurement of the modulus at decreasing temperatures. The temperature at which the test sample exhibits two times its original modulus is recorded as $T_2$, five times its original modulus, $T_5$, etc. The test samples with the methyl esters, (Experimentals II and III) as the extender exhibited $T_2$ and $T_5$ values similar to the control containing aromatic oil, which are considerably lower than those of the vulcanizate containing rosin acid. The naphthenic oil gave the lowest $T_2$ and $T_5$ values.

Table V sets out the dynamic properties and rebound values of Controls I and II and Experimentals I, II and III.

Volume losses on the ring abrasion test (Goodyear Angle Abrader) were extremely low for the vulcanizates containing rosin acid, the two esters or the naphthenic processing oil. Volume losses on the Pico abrasion test (ASTM D2228) at high load conditions (9.0

TABLE IV

| | Cure Behavior and Vulcanizate Properties | | | | |
|---|---|---|---|---|---|
| Extender | Control I Naphthenic | Control II Aromatic | Exp. I Rosin Acid | Exp. II Methyl Ester | Exp. III Hydrogenated Methyl Ester |
| ML/4 @ 100° C. | 59 | 56 | 61 | 66 | 66 |
| Rheometer 149° C. | | | | | |
| Max. Torque | 56 | 56 | 41 | 54 | 57 |
| Min. Torque | 13 | 11 | 14 | 15 | 14 |
| Δ Torque | 43 | 45 | 27 | 39 | 43 |
| $T_{90}$, Minutes | 21 | 20 | 46 | 18 | 20 |
| $T_2$, Minutes | 8.5 | 8 | 8 | 7 | 7.5 |
| Stress**** Strain | | | | | |
| TS,* MPa | 12.7 | 17.5 | 13.4 | 17.6 | 17.8 |
| EB,** % | 335 | 470 | 810 | 530 | 425 |
| $M_{300}$,*** MPa | 10.0 | 10.0 | 4.3 | 8.5 | 11.2 |
| Shore A | 64 | 65 | 75 | 66 | 66 |
| Young's Modulus 25° C., psi | 685 | 805 | 895 | 808 | 962 |
| ASTM D1053**** $T_2$, °C. | −36 | −26 | −8 | −28 | −29 |
| Flex Test | | | | | |
| $T_5$, °C. | −50 | −39 | −27 | −39 | −41 |
| $T_{10}$, °C. | −53 | −45 | −35 | −45 | −46 |
| $T_{100}$, °C. | −65 | −57 | −59 | −58 | −58 |

*TS - Tensile Strength
**EB - Elongation at break
***$M_{300}$ - 300% Modulus
****Samples cured 32 min. at 149° C.

TABLE V

| | Vulcanizate Properties | | | | |
|---|---|---|---|---|---|
| | Control I Naphthenic | Control II Aromatic | Exp. I Rosin Acid | Exp. II Methyl Ester | Exp. III Hydrogenated Methyl Ester |
| Dynamic* Properties 100° C. | | | | | |
| Modulus, Kg/cm² | 76.6 | 77.1 | 81.0 | 80.2 | 82.8 |
| Resilience, % | 55.2 | 48.7 | 23.9 | 45.5 | 51.6 |
| Internal Vsc. Kp | 19.2 | 23.4 | 49.0 | 26.7 | 23.1 |
| Hx | 88.2 | 101.6 | 158.5 | 112.4 | 102.9 |
| Hf | 67.3 | 76.5 | 108.0 | 78.1 | 67.2 |
| Rebound** | | | | | |
| Cold, % | 57.4 | 53.4 | 39.8 | 52.9 | 54.9 |
| Hot, % | 71.8 | 69.6 | 46.8 | 66.8 | 69.6 |
| Goodrich* Flex | | | | | |
| Set, % | 2.5 | 3.1 | — | 4.4 | 3.3 |
| Temp Rise, °C. | 35 | 38 | — | 41 | 38 |
| Static Comp, in | .418 | .422 | — | .416 | .399 |
| Hardness | 63 | 63 | — | 64 | 65 |
| Ring* Abrasion | | | | | |
| Volume Loss, cc | .04 | .65 | .16 | .10 | .02 |
| Pico** Abrasion | | | | | |
| Volume Loss (cc) at 9.0 Kg load | 40 | 45 | 51 | 50 | 50 |

*samples cured 42 min. at 149° C.
**samples cured 47 min. at 149° C.

The dynamic properties (ASTM D2231) and rebound values (ASTM D1054) of the vulcanizates containing the two methyl esters, Experimentals II and III, particularly the hydrogenated ester (Hercolyn D)™, Experimental III, compared favorably with the controls containing aromatic oil, whereas the rosin acid (Experimental I) gave low dynamic resilience and rebound.

The equivalence in dynamic properties between the rosin ester and oil extended samples was also reflected by the Goodrich flex data (ASTM D623). In this case, however, the rosin acid extended sample was too soft to obtain a measurement.

Kg) were low for the two esters as well as rosin acid.

In Table VI a comparison was made of the processability of these samples as measured by the Monsanto capillary rheometer. The control samples gave similar stress values over the shear rates investigated, but the naphthenic oil gave slightly higher dynamic die swell. The test samples containing the two esters showed similar stress and stress relaxation values, which were somewhat higher than the controls, and dynamic die swell similar to the control with naphthenic oil. The test sample with rosin acid gave the highest shear stress and stress relaxation values and lowest dynamic die swell.

TABLE VI

| | | Capillary Rheometer Data* | | | |
|---|---|---|---|---|---|
| | Extender | Apparent Shear Rate (sec$^{-1}$) | P Pressure Drop (MPa) | Dynamic Die Swell (%) | Static** Die Swell (%) | Stress*** Relaxation (sec) |
| Control I | Napthenic Oil | 15.4 | 11.9 | 17.5 | 16.1 | — |
| | | 53 | 16.9 | 19.1 | 22.3 | — |
| | | 169.3 | 23.1 | 19.8 | 27.5 | — |
| | | 554 | 28.5 | 20.5 | — | 1.56 |
| Control II | Aromatic Oil | 15.4 | 12.5 | 15.8 | 15.4 | — |
| | | 53 | 17.4 | 17.8 | 20.1 | — |
| | | 169.3 | 23.2 | 17.9 | 22.3 | — |
| | | 554 | 29.0 | 17.6 | — | 1.45 |
| Exp. I | Rosin Acid | 15.4 | 18.0 | 12.1 | 12.0 | — |
| | | 53 | 24.0 | 13.5 | 15.3 | — |
| | | 169.3 | 29.4 | 15.1 | 17.8 | — |
| | | 554 | 34.5 | 17.4 | — | 3.41 |
| Exp. II | Methyl Ester of Rosin | 15.4 | 15.9 | 16.4 | 16.7 | — |
| | | 53 | 20.8 | 18.7 | 20.2 | — |
| | | 169.3 | 27.0 | 18.9 | 23.4 | — |
| | | 554 | 33.0 | 19.6 | — | 1.92 |
| Exp. III | Hydrogenated Methyl Ester of Rosin | 15.4 | 15.2 | 17.6 | 18.1 | — |
| | | 53 | 20.3 | 19.2 | 21.9 | — |
| | | 169.3 | 26.8 | 19.0 | 24.7 | — |
| | | 554 | 33.0 | 19.9 | — | 1.84 |

*Orifice: 0.0788" (0.2 cm) diameter; 16/1 L/D; 116° C.
**Static die swell @ 30 sec
***Time to relax to 33% of final stress value From Controls I and II and Experimentals I, II and III it is evident that the methyl esters of rosin acid appear to be suitable candidates as replacements for petroleum based extending oils in tire compounds. Although the current economics are not favorable for the use of these rosin esters as petroleum oil replacements, projections of petroleum prices compared to rosin acid prices might make these more attractive as future alternate sources for rubber extension.

Several additional rosin esters were prepared and evaluated as replacements for petroleum based extending oils in certain rubber formulations. The decyl, 2-ethylhexyl, isooctyl and isobutyl esters of Pinex ™ wood rosin were prepared according to known chemical reactions. These rosinates and the hydrogenated methyl ester of rosin (Hercolyn D ™) were evaluated in a rubber tread stock formulation together with several controls.

Nonproductive tread compounds containing the composition as shown in Table VII were mixed in a BR Banbury using two separate passes for three minutes at 70 RPM.

TABLE VII

| TREAD COMPOUND COMPOSITION | |
|---|---|
| | Wt Parts |
| SBR* | 70 |
| Polybutadiene** | 30 |
| GPT Carbon Black | 70 |

TABLE VII-continued

| TREAD COMPOUND COMPOSITION | |
|---|---|
| | Wt Parts |
| Extender | 35 |

*Acid/Alum coagulated; contains 1.25 phr Wingstay 29 ™, (p-oriented styrenated diphenylamines) as a stabilizer.
**Budene 1207 ™ - The Goodyear Tire & Rubber Company.

The sulfur and accelerator were added to the nonproductive compound in a third Banbury mix for 3 minutes at 40 RPM. Banbury input energy and temperature at dump for these batches are shown in Table VIII.

Table IX sets out some of the vulcanizate properties of the different samples after curing for 32 minutes at 149° C.

TABLE XIII

| | | BANBURY MIX CONDITIONS | | | | | | |
|---|---|---|---|---|---|---|---|---|
| | | Non-Prod* | | Non-Prod** | | Productive*** | | Total |
| Sample | Extender | Work MJ/M$^3$ | Temp. °C. | Work MJ/M$^3$ | Temp. °C. | Work MJ/M$^3$ | Temp. °C. | Work MJ/M$^3$ |
| A | Control-aromatic Oil | 740 | 132 | 820 | 138 | 465 | 79 | 2025 |
| B | Methyl ester of rosin | 803 | 146 | 793 | 154 | 473 | 93 | 2069 |
| C | 2-ethyl hexyl ester | 683 | 141 | 813 | 160 | 460 | 93 | 1956 |
| D | Decyl ester | 710 | 141 | 735 | 160 | 410 | 146 | 1855 |
| E | Isobutyl ester | 813 | 126 | 798 | 149 | 413 | 88 | 2024 |
| F | Isooctyl ester | 768 | 126 | 813 | 141 | 390 | 88 | 1971 |

*3 min @ 70 RPM
**3 min @ 70 RPM
***3 min @ 40 RPM

TABLE IX

| | Vulcanizate Properties | | | | | |
|---|---|---|---|---|---|---|
| | Sample | | | | | |
| Rosinate Extender | A Control | B Methyl | C 2-ethyl hexyl | D decyl | E iso-butyl | F iso-octyl |
| Stress Strain TS. MPa | 17.7 | 18.0 | 17.0 | 14.5 | 16.5 | 15.5 |
| EB, % | 435 | 420 | 435 | 430 | 425 | 425 |
| M$_{300}$. MPa | 11.3 | 12.0 | 10.7 | 10.5 | 10.6 | 10.1 |
| Shore A | 67 | 67 | 67 | 65 | 67 | 66 |
| 66% Flex** Avg Min. | 47 | 147+ | 6 | 7 | 7 | 4 |
| 93° C. No. of Strips | 0 | 6 | 0 | 0 | 0 | 0 |

TABLE IX-continued

Vulcanizate Properties

| Rosinate Extender | Sample A Control | B Methyl | C 2-ethyl hexyl | D decyl | E iso-butyl | F iso-octyl |
|---|---|---|---|---|---|---|
| 180+ min. Dynamic Properties 100° C. | | | | | | |
| Modulus, kg/cm$^2$ | 75.8 | 73.5 | 72.8 | 70.3 | 72.3 | 70.9 |
| Resilience, % | 43.6 | 46.8 | 39.2 | 38.6 | 39.6 | 40.6 |
| Int Visc, Kp | 26.5 | 23.5 | 28.8 | 28.2 | 28.3 | 26.9 |
| $H_x$ | 109.7 | 100.5 | 113.7 | 110.9 | 112.3 | 108.1 |
| $H_f$ | 85.5 | 83.1 | 96.0 | 100.3 | 96.1 | 96.3 |
| Rebound** | | | | | | |
| Cold, % | 52.9 | 55.9 | 52.0 | 52.9 | 52.0 | 52.0 |
| Hot, % | 69.6 | 72.4 | 67.4 | 66.8 | 65.7 | 65.2 |
| Goodrich* Flex | | | | | | |
| Set | 2.7 | 2.5 | 3.7 | 3.7 | — | — |
| Temp Rise, °C. | 41 | 39 | 44 | 43 | — | — |
| Static Comp, in | .228 | .232 | .232 | .258 | — | — |
| Hardness | 66 | 65 | 66 | 63 | — | — |
| Pico* Abrasion | | | | | | |
| cc Loss 9.0 Kg Load | .050 | .048 | .050 | .055 | .055 | .056 |
| Rheometer 149° C. | | | | | | |
| Max Torq | 60 | 59 | 56 | 51 | 60 | 57 |
| Min Torq | 12 | 13 | 12 | 10 | 15 | 14 |
| Δ Torq | 48 | 46 | 44 | 41 | 45 | 43 |
| $T_{90}$ | 16 | 18.5 | 18.5 | 17.5 | 16.5 | 15.5 |
| $T_2$ | 7 | 6.5 | 7 | 7 | 6.5 | 6.5 |
| ML/4 @ 100° C. | 63 | 66 | 69 | 62 | 71 | 66 |
| Gehman** | | | | | | |
| Youngs Modulus @ 25° C., MPa | 6.4 | 4.7 | 4.9 | 5.0 | 6.3 | 5.7 |
| (psi) | (926) | (685) | (707) | (729) | (909) | (827) |
| $T_2$, °C. | −30 | −28 | −26 | −29 | −27 | −26 |
| $T_5$, °C. | −41 | −41 | −40 | −43 | −42 | −43 |
| $T_{10}$, °C. | −47 | −46 | −47 | −48 | −47 | −48 |

*Samples cured 42' @ 300° F.
**Samples cured 47' @ 300° F.

Generally, the use of the esters as replacements for aromatic oil produced the following effects: lower state of cure (Δ torque) lower tensile and modulus, poor flex life and inferior dynamic properties. In contrast the methyl ester of rosin (Sample B) gave improved flex life and dynamic properties.

The methyl ester gave excellent cure behavior and cured physical properties, comparable to those obtained with the aromatic oil (Sample A).

The samples containing the rosin esters or the methyl ester exhibit smaller rheometer Δ torque values when compared to the control Sample A containing aromatic oil, but show fairly similar cure behavior as measured by $T_{90}$ and $T_2$ values. The decyl rosinate, which gave the lowest Δ torque value, contains 30 weight percent aromatic oil which was added during preparation to convert it from a solid to a soft paste.

The tensile strength and 300 percent modulus of the vulcanizates containing the esters were lower than the control A containing aromatic oil and the methyl ester Sample B extended vulcanizate. The low temperature performance of these vulcanizates was determined by use of the ASTM D1053 flex test. The test samples with the rosin esters as the extending oil exhibit 10 to 25 percent lower modulus values and slightly higher $T_2$ values when compared to the control A. However, these small differences would not be expected to have a negative effect on low temperature performance. The control sample has better flex resistance than the samples containing the esters, but inferior flex life when compared with the vulcanizate containing the methyl ester.

The dynamic resilience and hot rebound values of the vulcanizates containing the rosin esters are lower than the control containing aromatic oil, whereas the methyl ester gave higher dynamic resilience and rebound values. These differences in dynamic properties were also reflected in the heat build-up data from the Goodrich flex test. Volume losses on the Pico abrasion test at normal load conditions (4.5 Kg) were similar for all samples tested. At higher load conditions (9.0 Kg) the methyl ester gave the lowest volume loss.

Rosin esters when used as replacements for petroleum based aromatic extending oil, produce cured vulcanizates which exhibit excellent low temperature properties. However, they are inferior in other cured properties when compared with aromatic oil or the methyl ester of rosin.

During another experiment the formulation set out at Table VII was used to compare the effect of aging on vulcanizate samples containing aromatic oil or the methyl ester of rosin (Hercolyn D TM). Cured samples were aged in a circulating air oven for 3 days at 100° C. or aged in a nitrogen bomb (552 kPa (80 psi $N_2$)) for 5 days at 122° C. The original and aged properties are shown in Table X.

TABLE X

| | | Control Aromatic Oil | Exp. Methyl Ester |
|---|---|---|---|
| ML/4 @ 100° C. | | 56 | 62 |
| Rheometer | Max Torq. | 56 | 56 |
| 149° C. | Min Torq. | 11 | 13 |
| | Δ Torq | 45 | 43 |
| | $T_{90}$ | 18 | 18 |
| | $T_2$ | 7.5 | 7.0 |
| Stress | Ts, MPa | 15.7 | 16.1 |
| Strain | EB, % | 460 | 440 |
| Original | $M_{200}$ MPa | 4.8 | 5.1 |
| | Shore A | 66 | 65 |
| Stress | TS, MPa | 12.2 | 13.2 |
| Strain | EB, % | 270 | 240 |
| Aged 3 days | $M_{200}$, MPa | 8.8 | 10.7 |
| Air oven, 100° C. | Shore A | 74 | 77 |
| Stress | TS, MPa | 13.1 | 13.1 |
| Strain | EB, % | 350 | 320 |
| Aged 5 days | $M_{200}$, MPa | 5.7 | 6.6 |
| $N_2$ bomb, 122° C. | Shore A | 67 | 69 |
| Original Vulcanizate | | | |
| ASTM | Young's Mod. | | |
| D1053 | @ 25° C., MPa | 6.5 | 5.5 |
| Flex | $T_2$, °C. | −30 | −28 |
| Test | $T_5$, °C. | 43 | −40 |
| Air Aged Vulcanizate | | | |
| Flex | Young's Mod | | |
| Test | @ 25° C., MPa | 7.8 | 9.8 |
| | $T_2$, °C. | −25 | −23 |
| | $T_5$, °C. | −41 | −41 |
| Nitrogen Aged Vulcanizate | | | |
| Flex | Young's Mod | | |
| Test | @ 25° C., MPa | 5.3 | 6.4 |
| | $T_2$, °C. | −30 | −27 |
| | $T_5$, °C. | −41 | −41 |
| Dynamic Modulus, kg/cm$^2$ | | 72.1 | 65.8 |
| Properties Resilience, % | | 39.3 | 42.4 |
| 100° C. Int Visc, Kp | | 28.4 | 23.8 |
| Hx | | 112.4 | 97.4 |
| Hf | | 96.8 | 100.7 |
| Dynamic Modulus, Kg/cm$^2$ | | 85.2 | 100.8 |
| Properties Resilience, % | | 41.5 | 43.8 |
| 100° C. Int. Visc. Kp | | 31.6 | 35.1 |
| Aged 3 days Hx | | 128.0 | 145.5 |
| Air oven, 100° C. Hf | | 79.0 | 64.1 |
| Dynamic Modulus, kg/cm$^2$ | | 65.6 | 78.0 |
| Properties Resilience, % | | 42.0 | 42.4 |
| 100° C. Int. Visc. Kp | | 24.0 | 28.2 |

TABLE X-continued

| Aged 5 days Hx | | | 97.8 | | 115.4 | |
|---|---|---|---|---|---|---|
| $N_2$ bomb, 122° C. Hf | | | | 101.6 | | 84.9 |

| Vulcanizate Properties | Orig. | Air Aged | $N_2$ Aged | Orig. | Air Aged | $N_2$ Aged |
|---|---|---|---|---|---|---|
| De Mattia Flex Pierced Inches Crack Growth | | | | | | |
| @ $5 \times 10^5$ flexes | 1.0 | 1.0 | 0.95 | 0.70 | 0.95 | 0.45 |
| @ $5 \times 10^5$ flexes | — | — | 1.0 | 1.0 | 0.96 | 0.67 |
| @ $1 \times 10^6$ flexes | — | — | — | — | 1.0 | 0.67 |
| Flexes to Failure | $5 \times 10^4$ | $2.8 \times 10^4$ | $7.5 \times 10^4$ | $8.6 \times 10^4$ | $7.0 \times 10^5$ | — |
| Pico Abrasion 4.5 Kg Load | .016 | — | — | .015 | — | — |
| cc Loss 9.0 Kg Load | .053 | .075 | .061 | .050 | .061 | .057 |

| | Control Aromatic Oil | Exp. Methyl Ester |
|---|---|---|
| Original Vulcanizate | | |
| Crosslink density, $v \times 10^4$, moles/cm$^3$ | 2.24 | 2.21 |
| Crosslink distribution | | |
| Polysulfide $S_x$, % | 43 | 52 |
| Disulfide, $S_2$, % | 29 | 17 |
| Monsulfide, $S_1$, % | 28 | 31 |
| % by Wt. Extractable - heptane solvent | 20.6 | 20.1 |
| Air Aged Vulcanizate | | |
| Crosslink density, $y \times 10^4$, moles/cm$^3$ | 3.53 | 3.99 |
| Crosslink distribution, $S_x$, % | 31 | 35 |
| $S_2$, % | 25 | 26 |
| $S_1$, % | 44 | 39 |
| % Extractable | 17.0 | 7.00 |
| Nitrogen Aged Vulcanizate | | |
| Crosslink density, $v \times 10^4$, moles/cm$^3$ | 2.41 | 2.63 |
| Crosslink distribution $S_x$, % | 26 | 21 |
| $S_2$, % | 5 | 27 |
| $S_1$, % | 69 | 52 |
| % Extractable | 21.9 | 15.9 |

The experimental compound containing the methyl ester of rosin exhibits a higher Mooney than the control sample, but shows a similar cure behavior on the Monsanto rheometer. The original and aged 200 percent modulus values of the methyl ester containing vulcanizate are slightly higher than the control, whereas the tensile strength and elongation at break values are similar. The low temperature flex test (ASTM 1035) shows a larger increase of Young's modulus after aging for the experimental methyl ester sample, whereas the $T_2$ and $T_5$ values, which predict low temperature performance, are similar for both samples. The experimental sample exhibits a lower original dynamic modulus, but higher modulus than the control after aging. The original and aged dynamic resilience of the experimental is higher than the control. The original and aged flex properties of the experimental sample as measured by De Mattia flex are superior to the control. The abrasion resistance of the experimental sample as determined by the Pico test is better than the control, both original and after aging. Measurement of the % extractable in heptane of the cured vulcanizates gave totally unexpected results. The original unaged vulcanizates containing aromatic oil or the methyl ester exhibit similar amounts of % extractable in heptane. Extraction of the aged samples, particularly after air oven aging, indicates that the methyl ester of rosin has become nearly unextractable, whereas the aromatic oil exhibits only a small decrease of % extractable. The total amount of oil in the cured compounds is 16 percent by weight. The higher value for the original samples represents the extraction of uncured low molecular weight rubber and residues from the sulfur vulcanization system which normally amounts to a value of 5 to 10 percent depending upon the compounding recipe.

Nonproductive tread compounds containing the composition as shown in Table XI were mixed in a BR Banbury using three separate passes for three minutes at 70 RPM.

TABLE XI
TREAD COMPOUND COMPOSITION

| | Wt. Parts |
|---|---|
| Natural Rubber* | 50 |
| SBR** | 25 |
| Polybutadiene*** | 25 |
| Carbon Black | 60 |
| Extender | 14 |

*#3 Ribbed Smoked Sheet
**Acid/Alum coagulated SBR 1712, contains 1.25 phr Wingstay 29 ™
***Budene 1207 ™

The sulfur and accelerator were added to the nonproductive compounds in a fourth Banbury mix for 3 minutes at 40 RPM. A comparison of the vulcanizate properties when using aromatic oil or rosin ester as the extender is shown in Table XII.

TABLE XII
CURE BEHAVIOR AND VULCANIZATE PROPERTIES

| | | Sample A Aromatic Oil | Sample B Methyl Ester |
|---|---|---|---|
| ML/4 @ 100° C. | | 64 | 65 |
| Rheometer 149° C. | Max Torque | 59 | 59 |
| | Min Torque | 13 | 14 |
| | Δ Torque | 46 | 45 |
| | $T_{90}$, minutes | 21 | 20 |
| | $T_2$, minutes | 8 | 7 |
| Stress Strain | TS, MPa | 20.0 | 18.5 |
| | EB, % | 470 | 450 |
| | $M_{300}$, MPa | 11.5 | 10.8 |
| | Shore A | 69 | 68 |
| Rebound** | Cold, % | 55.9 | 57.9 |
| | Hot, % | 67.9 | 69.0 |

*Samples cured 32 minutes @ 149° C.
**Samples cured 42 minutes @ 149° C.

The Mooney of the compounded stocks, cure behavior and stress-strain properties were similar for both compounds. The methyl ester containing vulcanizates (Sample B) exhibited higher cold and hot rebound.

A rubber composition containing the materials set out in Table XIII was prepared in a BR Banbury using two separate passes for three minutes at 70 RPM.

TABLE XIII

| Material | Wt. Parts |
|---|---|
| SBR* | 70 |
| Polybutadiene** | 30 |
| GPT Carbon Black | 70 |
| Extender | 35 |

*Acid/Alum coagulated SBR 1712 latex containing 1.25 phr - Wingstay 29 ™
**Budene 1207 ™

The sulfur and accelerator was added to the compounds in a third Banbury mix for 3 minutes at 40 RPM. Aromatic oil, methyl ester of rosin (Hercolyn D ™) or a 50/50 blend of the two was added directly to the Banbury during the nonproductive mixing stages.

Table XIV sets out the cure behavior and vulcanizate properties of the aromatic oil control and the experimental samples.

TABLE XIV

Cure Behavior and Vulcanizate Properties

| phr | | Sample A Aromatic Oil 35 phr | Sample B Aromatic Oil 17.5 phr, Methyl Ester, 17.5 phr | Sample C Methyl Ester, 35 |
|---|---|---|---|---|
| ML/4 @ 100° C. | | 64 | 61 | 63 |
| Rheometer 149° C. | Max Torque | 61 | 65 | 63 |
| | Min Torque | 8 | 10 | 10 |
| | Δ Torque | 53 | 55 | 53 |
| | T$_{90}$ | 14 | 13 | 14 |
| | T$_2$ | 5 | 4 | 4 |
| Stress* | TS, mPa$^1$ | 18.7 | 19.1 | 19.3 |
| Strain | EB, % | 500 | 460 | 480 |
| | M$_{300}$, mPa | 9.9 | 11.3 | 10.8 |
| Rebound | Cold, % | 49.6 | 51.5 | 53.0 |
| | Hot, % | 68.5 | 68.5 | 68.5 |

*Samples cured 32 minutes @ 149° C.
**Samples cured 42 minutes @ 149° C.

The Mooney of the compounded stocks, cure behavior and stress-strain properties were similar for the control (Sample A) and the two experimental compounds. The methyl ester containing vulcanizates (Samples B and C) exhibit higher cold rebound, but similar hot rebound compared to the control.

TABLE XV

COMPOUNDING RECIPE

| Material | Wt Parts |
|---|---|
| Chemigum N615 TM (butadiene/acrylonitrile copolymer) | 100.00 |
| Methyl ester of rosin | 30.00 |
| FEF carbon black | 60.00 |
| Zinc Oxide | 5.00 |
| Stearic Acid | .50 |
| Spider Sulfur | .40 |
| Methyl Tuads TM | 1.00 |
| Altax TM | 2.00 |

*Hercolyn D TM

Using the compounding recipe shown in Table XV the methyl ester of rosin is mixed with Chemigum N615 TM, carbon black, and other ingredients to produce a methyl ester extended butadiene/acrylonitrile copolymer composition.

While certain representative embodiments and details have been shown for the purpose of illustrating the invention, it will be apparent to those skilled in this art that various changes and modifications may be made therein without departing from the scope of the invention.

What is claimed is:

1. A process for preparing rubber compositions which comprises admixing a rubber selected from the group consisting of natural rubber, homopolymers of conjugated diolefins and copolymers of conjugated diolefins and ethylenically unsaturated monomers with methyl esters of rosin acids at a concentration from 10 to 70 parts per hundred based on weight of rubber.

2. A process for preparing rubber compositions which comprises admixing a methyl ester of rosin acid, at a concentration from 10 parts per hundred to 70 parts per hundred based on weight of rubber, with said rubber.

3. In a cured rubber stock containing conventional rubber components, said stock being present in a rubber article, the improvement comprising: the stock having incorporated therein prior to curing thereof an ester of a wood rosin wherein the ester of wood rosin is substituted for at least 20% by weight of a petroleum derived product conventionally contained in said stock.

4. A cured rubber stock according to claim 3 wherein the ester of a wood rosin is the methyl ester.

5. A process according to claim 1 wherein the rubber is a 70/30 blend of SBR and polybutadiene and wherein the methyl esters of rosin acids is at a level of 35 parts per hundred of rubber.

6. A cured rubber stock according to claim 3 wherein the methyl ester of a wood rosin is substituted for at least 50% of a petroleum derived product conventionally contained in said stock.

7. A cured rubber stock according to claim 3 wherein the rubber is a 70/30 blend of SBR and polybutadiene, and wherein the ester of wood rosin in the methyl ester and wherein the methyl ester is substituted for at least 50% of a petroleum derived product conventionally contained in said stock.

8. A rubber article wherein the rubber is prepared according to the process of claim 1.

9. A rubber article wherein the rubber is prepared according to the process of claim 2.

* * * * *